United States Patent
Gunther et al.

(10) Patent No.: US 9,543,557 B2
(45) Date of Patent: Jan. 10, 2017

(54) TRACTION BATTERY ASSEMBLY

(71) Applicant: FORD GLOBAL TECHNOLOGIES, LLC, Dearborn, MI (US)

(72) Inventors: Tommy M. Gunther, Canton, MI (US); Rajaram Subramanian, Ann Arbor, MI (US); Stuart Schreiber, Inkster, MI (US); John Jardine, Harrison Township, MI (US); Keith Kearney, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 14/497,966

(22) Filed: Sep. 26, 2014

(65) Prior Publication Data

US 2016/0093847 A1    Mar. 31, 2016

(51) Int. Cl.
*H01M 2/00* (2006.01)
*H01M 2/10* (2006.01)
*H01M 10/625* (2014.01)
*H01M 10/6554* (2014.01)
*H01M 10/6556* (2014.01)

(52) U.S. Cl.
CPC ......... *H01M 2/1077* (2013.01); *H01M 10/625* (2015.04); *H01M 10/6554* (2015.04); *H01M 10/6556* (2015.04); *H01M 2220/20* (2013.01)

(58) Field of Classification Search
CPC .............. H01M 2/1077; H01M 10/625; H01M 10/6554; H01M 10/6556
See application file for complete search history.

(56) References Cited

U.S. PATENT DOCUMENTS

| | | | |
|---|---|---|---|
| 2,836,642 A | 5/1958 | Bauer | |
| 5,674,640 A | 10/1997 | Mrotek et al. | |
| 5,756,227 A * | 5/1998 | Suzuki | F28F 3/02 429/120 |
| 6,599,658 B2 | 7/2003 | Vackar | |
| 8,409,743 B2 * | 4/2013 | Okada | H01M 2/1077 429/120 |
| 2002/0179552 A1* | 12/2002 | Marraffa | H01M 2/1077 211/49.1 |

* cited by examiner

*Primary Examiner* — Helen O Conley
(74) *Attorney, Agent, or Firm* — David B. Kelley; Brooks Kushman P.C.

(57) ABSTRACT

A traction battery assembly for a vehicle includes an array of cells stacked on a tray. The array of cells defines opposing longitudinal sides and opposing lateral sides. First and second L-shaped components are attached to the tray. Each of the components includes an end wall and a sidewall that are integrally formed to define a substantially 90° corner. The first and second components are attached together such that each of the sidewalls is disposed adjacent one of the longitudinal sides and each of the end walls is disposed adjacent one of the lateral sides to form a housing around the tray that has an open top and an open bottom.

17 Claims, 4 Drawing Sheets

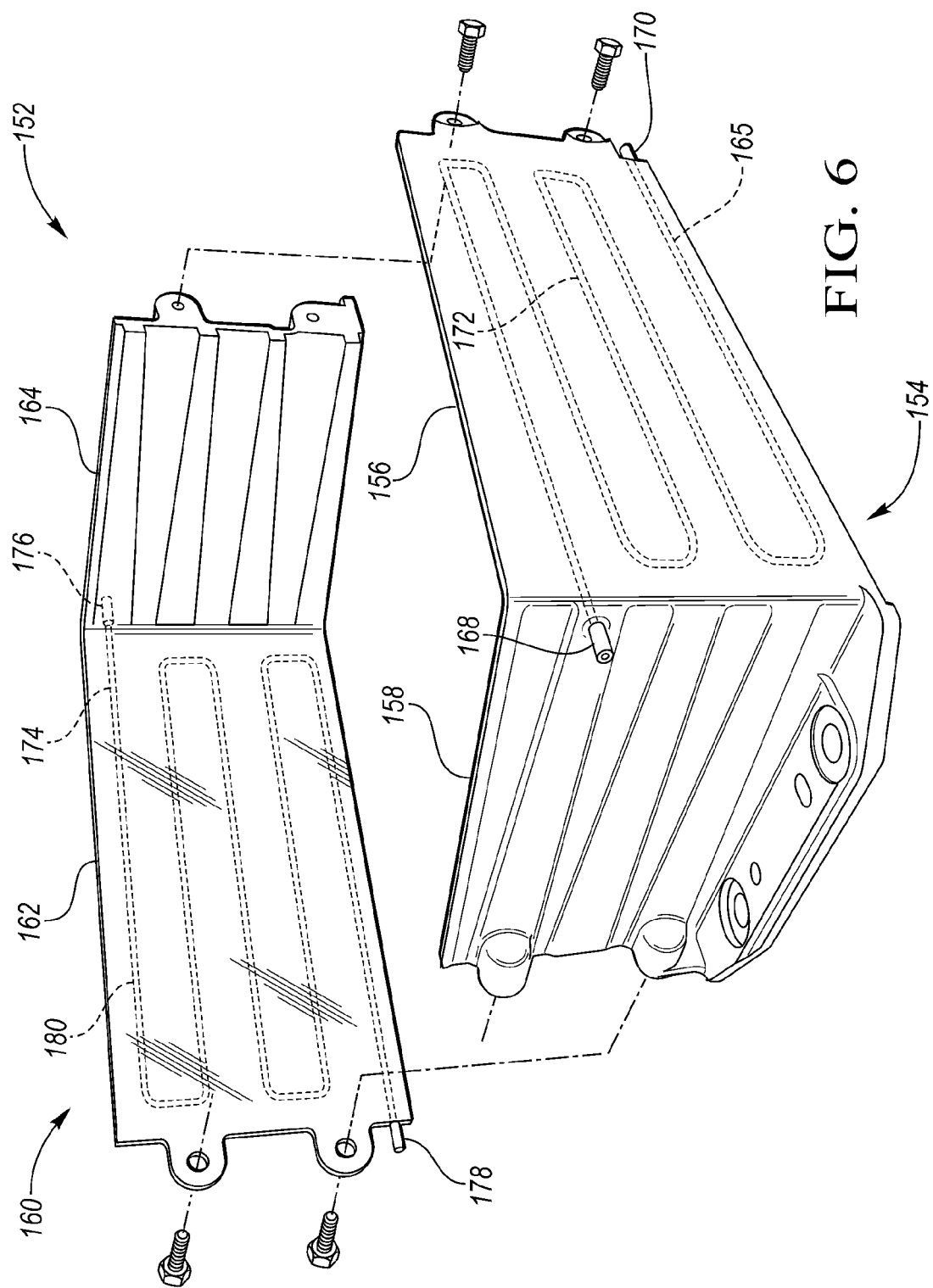

US 9,543,557 B2

TRACTION BATTERY ASSEMBLY

TECHNICAL FIELD

The present disclosure relates to traction battery assemblies for motor vehicles.

BACKGROUND

Vehicles such as battery-electric vehicles (BEVs), plug-in hybrid electric vehicles (PHEVs) and full hybrid-electric vehicles (FHEVs) contain a traction battery assembly to act as an energy source for the vehicle. The traction battery may include components and systems to assist in managing vehicle performance and operations. The traction battery may also include high voltage components.

SUMMARY

In one embodiment, a traction battery assembly includes an array of cells stacked on a tray and a pair of congruent L-shaped side components arranged to form a housing surrounding a perimeter of the array. The pair of components are attached together only at two corners of the housing to axially compress the array.

In another embodiment, a traction battery assembly for a vehicle includes an array of cells stacked on a tray. The array of cells defines opposing longitudinal sides and opposing lateral sides. First and second L-shaped components are attached to the tray. Each of the components includes an end wall and a sidewall that are integrally formed to define a substantially 90° corner. The first and second components are attached together such that each of the sidewalls is disposed adjacent one of the longitudinal sides and each of the end walls is disposed adjacent one of the lateral sides to form a housing around the array that has an open top and an open bottom.

In yet another embodiment, a traction battery assembly includes an array of cells stacked on the tray and a pair of same L-shaped side components supported by the tray. The L-shaped side components are arranged to form a housing around the array. Each of the components has a sidewall including a heat exchanger to thermally regulate the array.

BRIEF DESCRIPTION OF THE DRAWINGS

FIG. 6 illustrates an exploded perspective view of another battery assembly that includes at least one heat exchanger.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
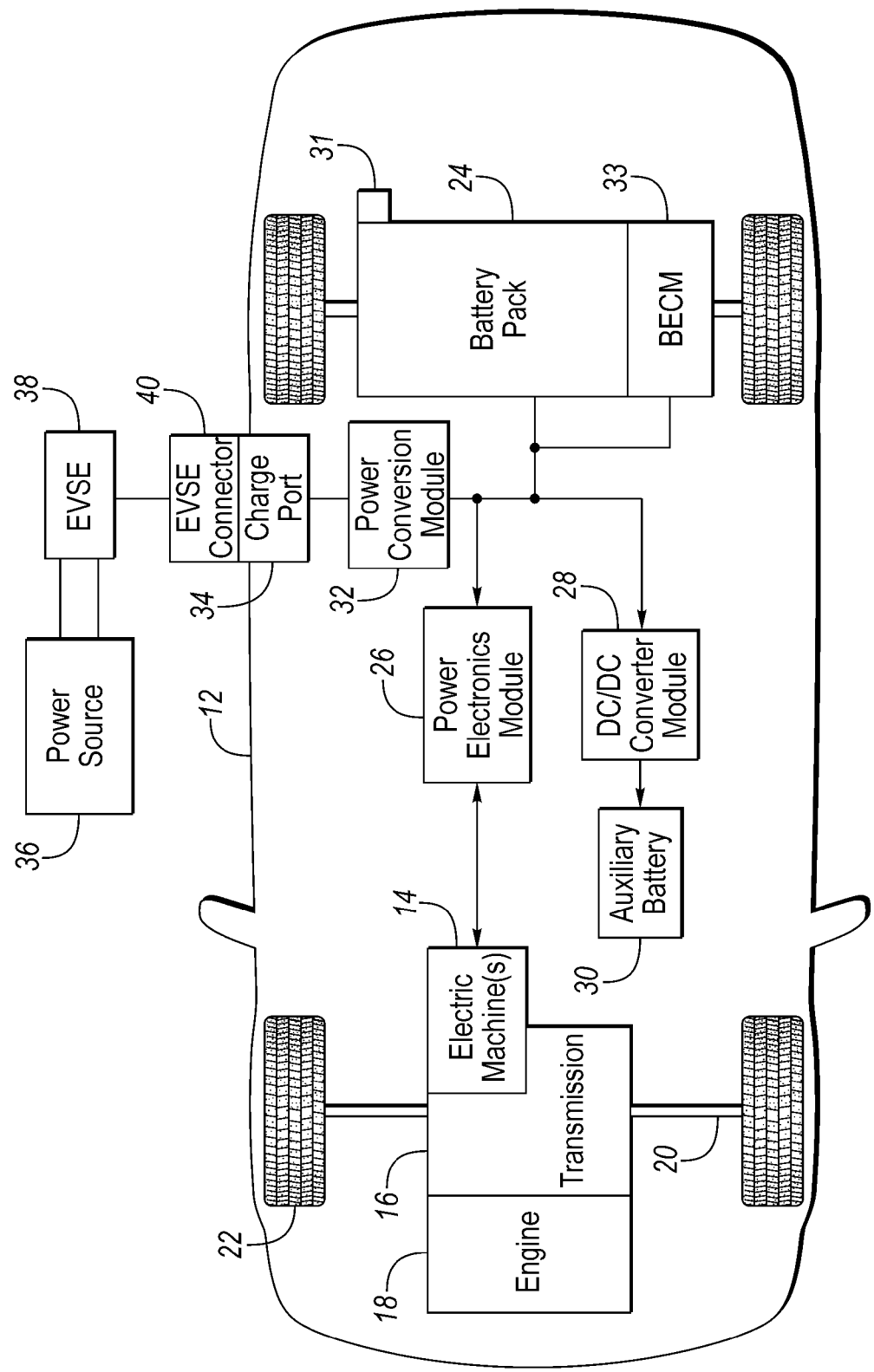
FIG. 1 depicts a schematic diagram of a typical plug-in hybrid-electric vehicle.
Figure 2:
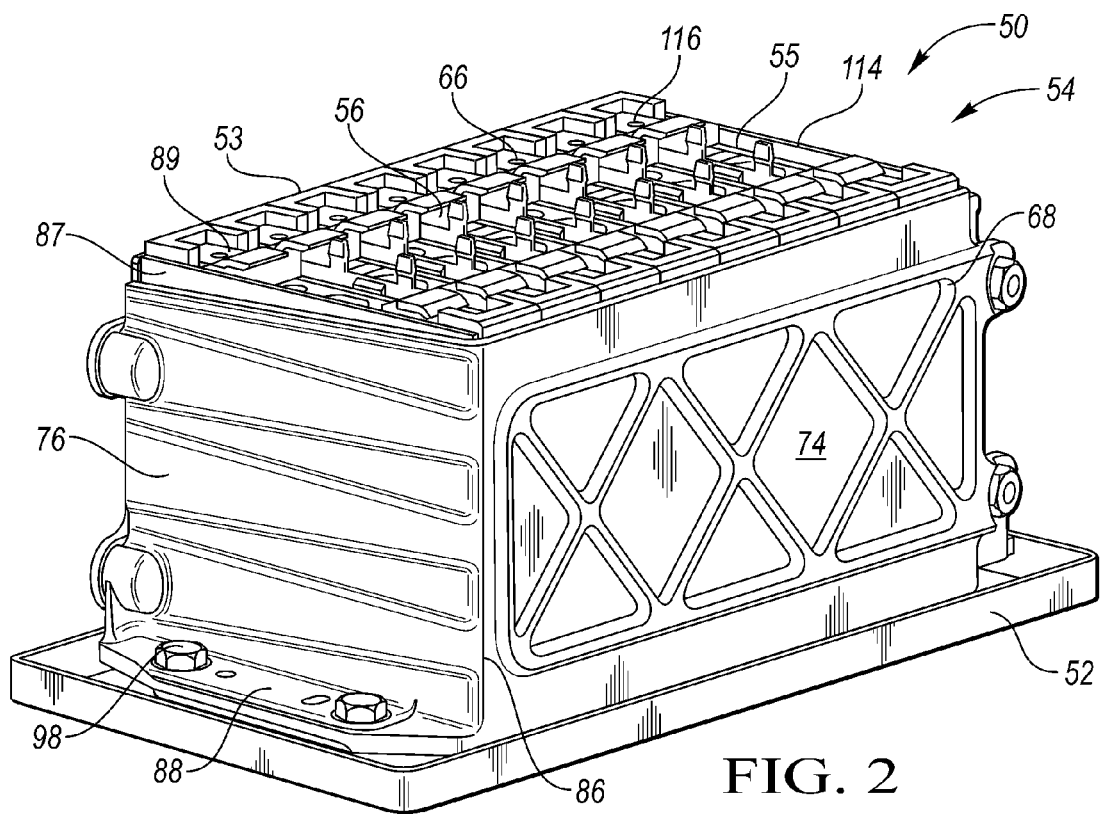
FIG. 2 illustrates a perspective view of a battery assembly.
Figure 3:
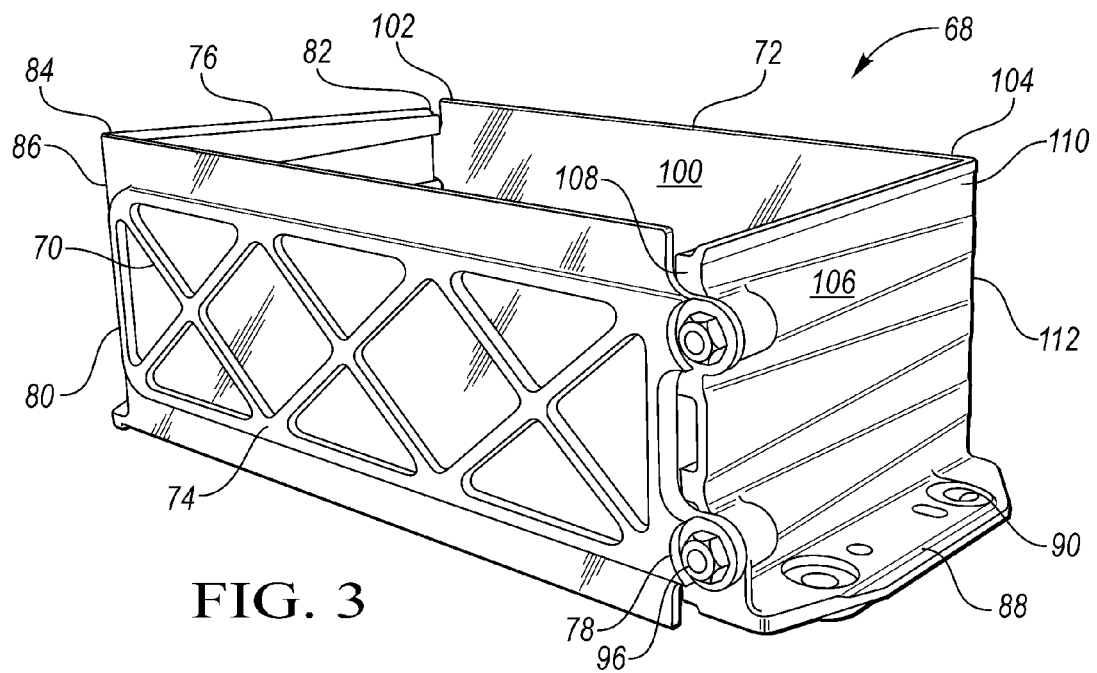
FIG. 3 illustrates a perspective view of a battery housing of the battery assembly shown in FIG. 2.
Figure 4:
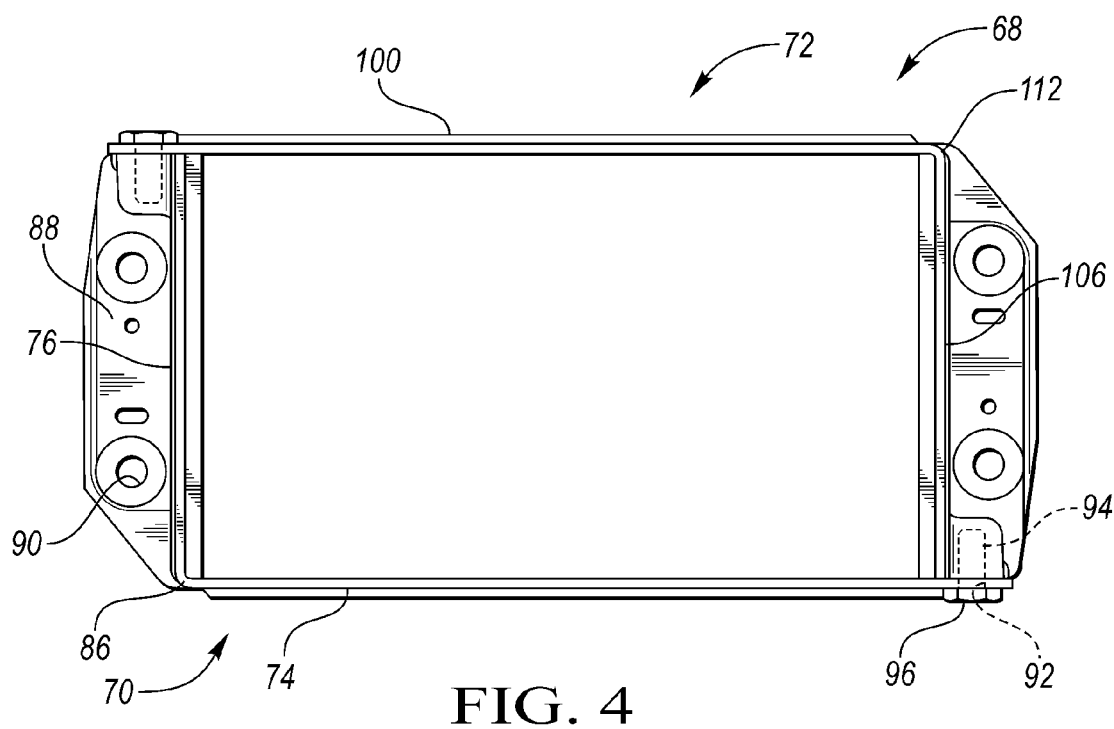
FIG. 4 illustrates a top view of the battery housing shown in FIG. 3.
Figure 5:
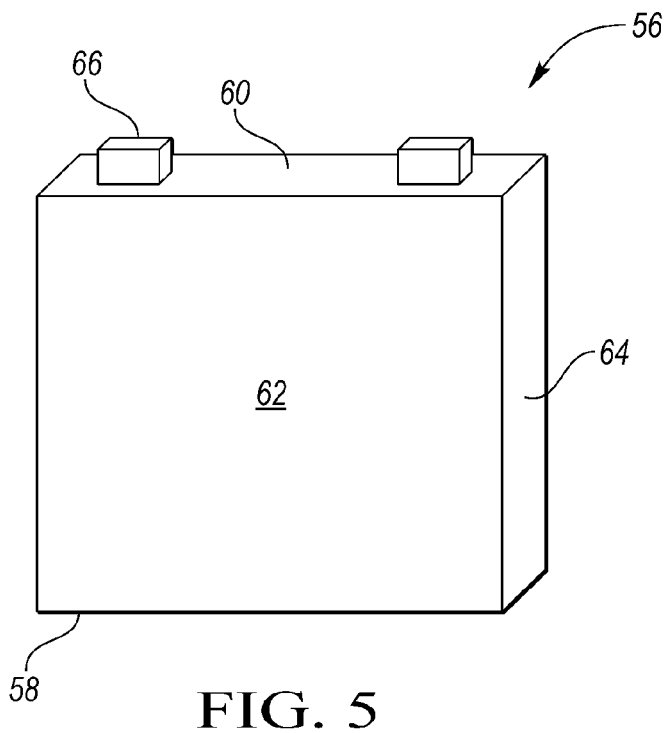
FIG. 5 illustrates a perspective view of a battery cell of the battery assembly shown in FIG. 2.

FIG. 1 depicts a schematic of a typical plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays may include one or more battery cells.

The battery cells, such as a prismatic or pouch cell, may include electrochemical cells that convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another.

Different battery pack configurations may be available to address individual vehicle variables including packaging constraints and power requirements. The battery cells may be thermally regulated with a thermal management system. Examples of thermal management systems may include air cooling systems, liquid cooling systems and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. In a pure electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 is a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via dedicated electrical conduits.

FIGS. 2 through 6 and the related discussion, describe examples of the traction battery assembly 24. Referring to FIGS. 2, 3, 4 and 5, a traction battery assembly 50 is shown. The traction battery assembly 50 includes a tray 52 that supports at least one battery array 54. The at least one battery array 54 includes a plurality of stacked battery cells 56. Each battery cell 56 may be a prismatic cell having a tray side 58 disposed adjacent to the tray 52. Each cell 56 may include a terminal side 60 opposite the tray side 58. Each cell 56 may also include opposing major sides 62 and opposing minor sides 64. The cells are stacked in the array with the major sides 62 of adjacent cells disposed against one another. The minor sides 64 of each cell collectively define opposing longitudinal sides 53 of the array 54. The outer major side of each of the two outer most cells 89, 116 defines opposing lateral sides 55 of the array 54. Each cell may include terminals 66 extending upwardly from the terminal side 60 of the cell 56.

A housing 68 surrounds the array 54. The housing holds the array together and applies axial force to compress the major sides 62 of the cells 56 together. The housing 68 may include cooperating first and second L-shaped components 70, 72 that when connected, define a four cornered housing having an open top and an open bottom. The array 54 is disposed within an interior of the housing. The L-shaped components 70, 72 may be congruent. The open bottom allows the cells to be disposed directly against the tray 52 and the open top allows access to the terminal side 60 of the cells 56. Alternatively, an insulator or thermal interface material may be disposed between the tray 52 and the array 54.

The first L-shaped component 70 includes a sidewall 74 having a joined end 80 and a free end 78. The component 70 also includes an end wall 76 including a free end 82 and a joined end 84. The joined end 80 of the sidewall 74 may be integrally formed with the joined end 84 of the end wall 76 to define a substantially 90° corner 86. The component 70 is disposed on the tray 52 with the end wall 76 and the sidewall 74 being substantially perpendicular to an upper surface of the tray 52. An interior surface of the end wall 76 may be disposed adjacent to the major side 62 of an outer cell 89. An end spacer 87 may be sandwiched between the end wall 76 and the outer cell 89. An interior surface of the sidewall 74 may be disposed adjacent to one of the longitudinal sides 53 of the array 54.

The second L-shaped component 72 includes a sidewall 100 having a joined end 104 and a free end 102. The component 72 also includes an end wall 106 having a free end 108 and a joined end 110. The joined end 104 of the sidewall 100 and the joined end 110 of the end wall 106 may be integrally formed to define a substantially 90° corner 112. The component 72 may be disposed on the tray 52 with the sidewall 100 and with the end wall 106 being substantially perpendicular to an upper surface of the tray 52. An interior surface of the end wall 106 may be disposed adjacent to the major side 62 of an outer cell 116. An end spacer 114 may be sandwiched between the end wall 106 and the outer cell 116. An interior surface of the sidewall 100 may be disposed adjacent to one of the longitudinal sides 53 of the array 54.

The first and second L-shaped components 70, 72 are connected together at one pair of corners. The free end 78 of sidewall 74 may be connected to the free end 108 of the end wall 106, and the free end 82 of the end wall 76 may be connected to the free end 102 of the sidewall 100. The end wall 106 and the sidewall 74 may be fastened together, or bonded together with adhesive or welding. In one embodiment, the free end 78 of the sidewall 74 defines a pair of holes 92. The end wall 106 defines a pair of tapped holes 94 that are aligned with the holes 92. A bolt 96 may be received through the holes 92 and into the tapped hole 94 to secure the end wall 106 and the sidewall 74 together. Alternatively, the fastening means may be a rivet, or a threaded stud and a nut. The end wall 76 and the sidewall 100 may be secured together in a manor similar to end wall 106 and sidewall 74. The length of each of the sidewalls may be less than the length of the opposing longitudinal sides 53 of the array such that the array is axial compressed between the end walls 76, 106 the array when the components 70, 72 are connected together.

Each of the end walls 76, 106 may include a flange 88 for mounting the housing 68 to the tray 52. The flange 88 may include mounting holes 90. The mounting holes 90 may receive bolts 98 that are received within corresponding tapped holes defined in the tray 52. Alternatively, the tray 52 may include studs extending upwardly from the tray that are received within the holes 90. A nut may be screwed onto the studs to secure the flange 88 to the tray 52. Alternatively, the flanges 88 may be welded or bonded to the tray 52. In another embodiment, the flanges are disposed on the sidewalls 74, 100 of the housing 68.

Referring to FIG. 6, another traction battery assembly includes a housing 152, that may be similar to housing 68 shown in FIGS. 2 through 5, that surrounds and retains the array of cells (not shown). The housing includes first and second L-shaped components 154, 160. The first L-shaped component 154 includes a sidewall 156 and an end wall 158. The second L-shaped component 160 includes a sidewall 162 and an end wall 164. The sidewall 156 of the first component 154 is connected to the end wall 164 of the second component 160 and the end wall 158 of the first component 154 is connected to the sidewall 162 of the second component 160.

The battery assembly may include at least one heat exchanger that is disposed along at least one of the longitudinal sides of the array. The heat exchanger may be a thermal plate that is disposed between the housing and the minor side 64 of each cell or may be integral with the housing. FIG. 6 illustrates opposing side heat exchangers that are each integral with one of the L-shaped components. The sidewall 156 includes a first heat exchanger 166. The heat exchanger 166 may supply heat to warm the cells or may remove heat to cool the cells. The heat exchanger 166 includes an inlet port 168 defined in the end wall 158 and includes an outlet port 170 defined in the sidewall 156. The sidewall 156 may define internal plumbing 172 that connects between the inlet port 168 and the outlet port 170. The internal plumbing 172 may be a single continuous flow path that serpentines between inlet and outlet ports. Alternatively, the plumbing 172 may be multiple flow paths. For example, the plumbing may be a plurality of straight pipes that are disposed at varying elevations of the sidewall 156. Manifolds may be used to connect the plurality of pipes to the inlet and outlet ports. A thermal management system (not shown) cycles a fluid medium (such as coolant or refrigerant) through the first heat exchanger 166.

The sidewall 162 includes a second heat exchanger 174. The heat exchanger 174 may supply heat to warm the cells or may remove heat to cool the cells. The heat exchanger 174 includes an inlet port 176 defined in the end wall 164 and includes an outlet port 178 defined in the sidewall 162. The sidewall 162 may define internal plumbing 180 that connects the inlet port 176 and the outlet port 178. The internal plumbing 180 may be similar to plumbing 172. The thermal management system also cycles a fluid medium through the second heat exchanger 174. The heat exchangers may share a common thermal management system or may have a dedicated thermal management system.

While the plumbing is shown having a circular shape, it is contemplated that other shapes may be available for the plumbing. The length, size and configuration of the plumbing may vary according to packaging constraints and desired thermal management performance. The inlet ports 168, 176 may be on opposing ends of the array such that the fluid medium of each heat exchanger flows in opposite direction. This may assist in providing a more uniform array temperature and increase overall heat transfer efficiency. Having thermal plates on either side of the array may provide increased surface contact area with the cells and increase performance of the thermal management system. When using two thermal plates, one common design may be used for both to assist in minimizing development and tooling costs.

In another embodiment, the heat exchanger may be a thermal plate that is disposed against the tray side of the cells. The heat exchanger may be integral with the tray or may be sandwiched between the tray and the terminal side of the cells.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
a tray;
cells each including a terminal side opposite the tray, and stacked in an array that is disposed on the tray; and
a pair of congruent L-shaped side components arranged to form a housing surrounding a perimeter of the array, and being attached together only at two corners to define an open top, the housing being attached to the tray such that the terminal sides extend through the top.

2. The battery assembly of claim 1 wherein the array further includes a pair of longitudinal sides and a pair of lateral sides extending between the longitudinal sidewalls, and wherein each of the L-shaped side components further includes an end wall disposed against one of the lateral sides, and a sidewall disposed against one of the longitudinal sides.

3. The battery assembly of claim 2 wherein each of the longitudinal sides further includes a heat exchanger to thermally regulate the array.

4. The battery assembly of claim 2 wherein a length of each of the sidewalls is less than a length of the opposing longitudinal sides of the array such that the array is axially compressed between the end walls when the first and second L-shaped components are attached together.

5. The battery assembly of claim 1 wherein the housing includes a flange that is fastened to the tray.

6. The battery assembly of claim 1 wherein the housing has only four corners.

7. The battery assembly of claim 1 wherein the housing defines an open bottom and each of the cells extends through the open bottom to contact the tray.

8. A traction battery assembly for a vehicle comprising:
a tray;
a plurality of cells each including a tray side disposed against the tray and a terminal side opposite the tray side, wherein the cells are stacked in an array that has longitudinal and lateral sides oriented substantially perpendicular to the tray; and
first and second L-shaped components each including a sidewall disposed against one of the longitudinal sides and an end wall disposed against one of the lateral sides, the pair of components being attached together only at two corners and cooperating to form a housing having an open bottom and surrounding a perimeter of the array, wherein the housing is attached to the tray such that the tray sides extend through the open bottom to contact the tray.

9. The battery assembly of claim 8 wherein the first and second L-shaped components are congruent.

10. The battery assembly of claim 9 wherein a length of each of the sidewalls is less than a length of the opposing longitudinal sides of the array such that the array is axially compressed between the end walls when the first and second L-shaped components are attached together.

11. The battery assembly of claim 8 wherein the array of cells is stacked directly on the tray.

12. The battery assembly of claim 8 wherein the end wall of each of the components is disposed over a major side of only one cell.

13. The battery assembly of claim 8 wherein the end wall of each of the components further includes a flange configured to be fastened to the tray.

14. The battery assembly of claim 8 wherein at least one of the first and second L-shaped components includes a heat exchanger to thermally regulate the array.

15. The battery assembly of claim 8 wherein the sidewall of each of the components further includes a heat exchanger to thermally regulate the array.

16. The battery assembly of claim 8 wherein the sidewall of the first L-shaped component defines internal plumbing that is configured to circulate a fluid medium to thermally regulate the array.

17. The battery assembly of claim 16 wherein the sidewall of the second L-shaped component defines internal plumbing that is configured to circulate a fluid medium to thermally regulate the array.

* * * * *